TAPE RECORDER WITH RANDOM-WIND CARTRIDGE

Original Filed Dec. 4, 1961

INVENTOR.
ALOYSIUS SEIDL
BY
Milburn & Milburn
ATTORNEYS 3,340,369

TAPE RECORDER WITH RANDOM-WIND CARTRIDGE

Aloysius Seidl, Cleveland, Ohio, assignor, by mesne assignments, to Robert C. Hunter, Cleveland, Ohio Continuation of application Ser. No. 156,598, Dec. 4, 1961. This application Mar. 22, 1966, Ser. No. 538,471
3 Claims. (Cl. 179—100.2)

This application is a continuation of my copending application Ser. No. 156,598, filed Dec. 4, 1961, now abandoned.

This invention is for a tape recorder in which the tape is of endless form.

One object of my present invention is to devise an improved means of removable engagement of the cartridge upon the tape deck.

Another object is to devise a tape recorder in which the familiar tape reel is eliminated by having the tape folded back and forth upon itself in a random manner within the cartridge.

Another object is to provide such an arrangement in which the pressure roller is permanently mounted within the cartridge body.

Another object is to devise a cartridge in which the tape always occupies one plane within the cartridge and throughout the entire operation.

Another object is to devise a cartridge in which there is precluded the danger of the windings of the tape climbing or twisting over each other.

Another object is to devise such a type of cartridge with a convenient and efficient means for initially effecting the winding of the tape within the same in random manner.

Other objects will appear from the following description and claims when considered together with the accompanying drawing.

Figures 1, 2:
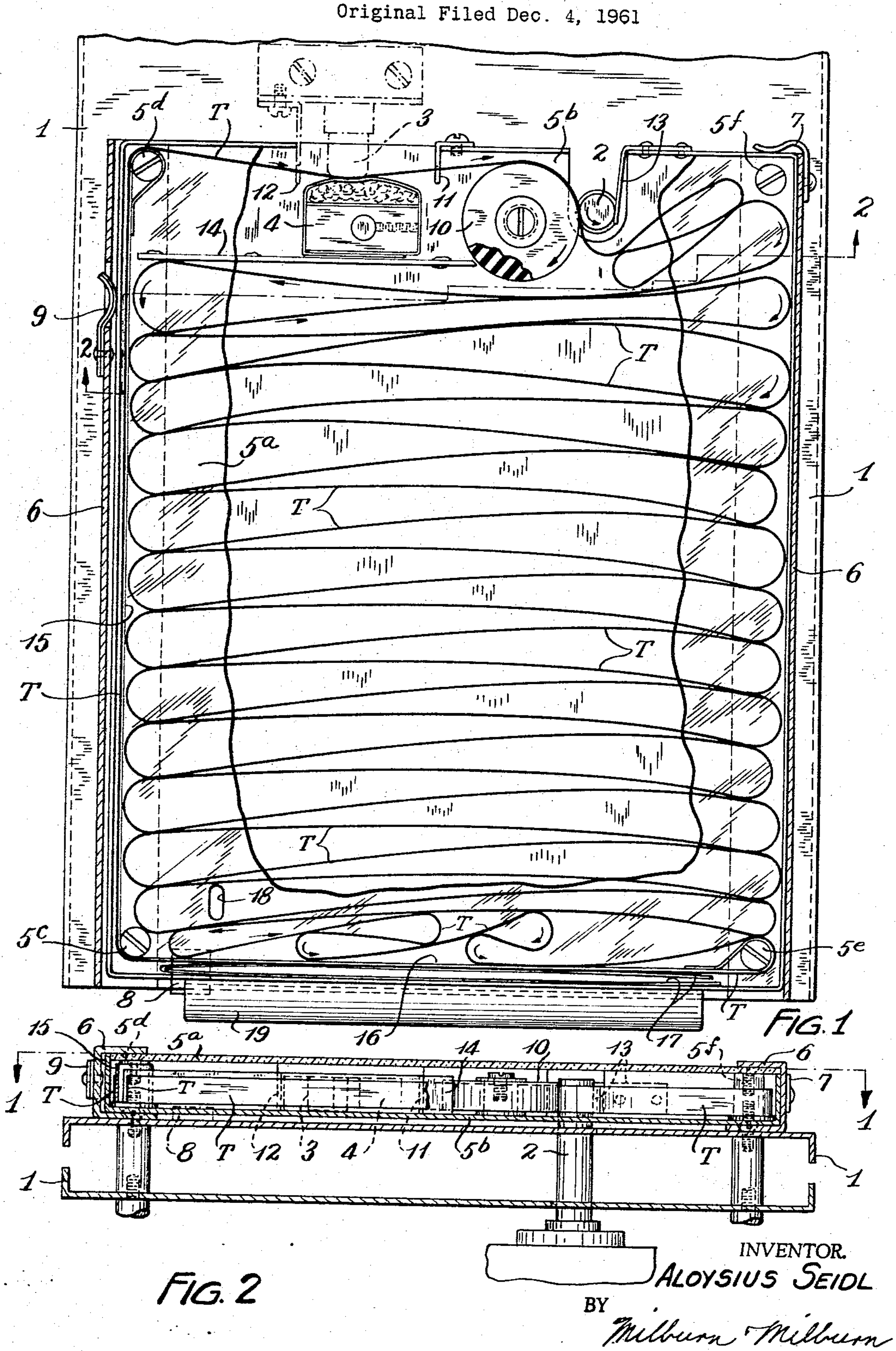
FIG. 1 is a top plan view of my present device with the transparent cover of the cartridge broken away so as to indicate that it has a cover.
FIG. 2 is a sectional view taken on line 2—2 of FIG. 1.

In the accompanying drawing the tape deck is indicated in a general way by reference numeral 1 and is provided with the usual capstan drive shaft 2 and the recording and reproducing heads 3 for co-operative engagement with the pressure pad 4 that is mounted upon the cartridge. The cartridge has a transparent top or cover plate 5a and a bottom 5b and is adapted for removable slidable engagement within opposite parallel companion channel members 6 on the top of the tape deck. The stop 7 at the forward end of the tape deck determines the position of the cartridge when in fully operative position upon the tape deck; and a releasable spring 8 holds the same in such assembly while the spring finger 9 on the tape deck extends through an opening in the side of the channel member so as to engage the one side of the cartridge and force the same towards the opposite channel member, thereby holding the same more firmly in assembly without danger of rattling. The forward end of the cartridge is provided with an end wall and a recess of suitable width to accommodate the drive shaft 2 and has also a suitable opening to permit operative engagement of the recording and reproducing heads 3 with the pad 4. The drive shaft 2 is adapted for operative engagement by the pressure roller that is permanently mounted within the marginal portion of the cartridge bounded by its said end wall; and such operative relationship is established when the cartridge is slid into fully engaged position upon the tape deck. Likewise, operative relationship is also established at the same time between the heads 3 and the pressure pad 4. The recess in the end of the cartridge is spaced therealong from the pressure roller and is of a depth wherein the plane of tangency between the capstan drive shaft and the pressure roller is substantially normal to the said end wall of the cartridge.

When the cartridge is loaded with an endless tape T, it extends about the pressure roller 10, the pressure pad 4 and the corner posts 5c, 5d and 5e that serve also with the corner post 5f to hold the top and bottom plates of the cartridge body together. There are provided tape guides 11 and 12 in the region of the pressure roller 10 and pressure pad 4, also a capstan guard plate 13 so as to ensure the tape T passing properly between the capstan shaft and the pressure roller 10, and a pressure roller guard plate 14 at the opposite side of the pressure roller 10 and to the rear of the pressure pad 4. Along one side of the cartridge there is what might be termed a fence 15 that is spaced from the cartridge wall and is open at its top so as to permit positioning of the tape T behind the same for guiding the tape from the front end of the cartridge to the rear end thereof; and another fence 16 for guiding the tape T is provided at the rear end of the cartridge. Within the space thus provided by the fence 16 there is a transversely extending bowed spring member 17 of "Mylar" or similar material to serve as a braking means for stopping the movement of the tape T upon withdrawal of the pressure roller 10 from engagement with the drive shaft 2. The guide fences 15 and 16 may also be made of the same material as the braking means 17.

In loading the cartridge with the endless tape, it is first placed in operative position about the pressure roller 10 and the pressure pad 4 and in position within the fences 15 and 16 and also about the corner posts 5c, 5d and 5e; and then, with the main body of the tape extending out through the slot 18 in the top plate 5a of the cartridge, the cartridge is mounted in operative position upon the tape deck so as to effect operation of the pressure roller 10 by the drive shaft 2, whereupon the tape will be drawn in through the slot 18 and will automatically fold back and forth upon itself in a random manner so as to assume the condition indicated in the present drawing. The slot 18 is located near the rear end of the top plate 5a of the cartridge and near the side corresponding to the corner post 5c and the slot 18 is slightly larger than the of the cartridge and near the side corresponding to the length of the cartridge body.

In my present form of cartridge, its top cover plate 5a is spaced from the bottom of the cartridge a distance less than twice the width of the tape T so as to preclude the danger of the tape windings twisting over each other edge-wise. For instance, with a tape ¼ inch wide, the top and bottom plates of the cartridge body may be spaced three-eighths of an inch apart.

The cartridge body may have a handle 19 at the rear end thereof as a means of facilitating placing the same into and removing the same from operative assembly upon the tape deck.

It is though that numerous practical advantages of my present device will readily suggest themselves to those who are familiar with the art to which it relates. For instance, by mounting the pressure roller within the cartridge body, the structure of the tape deck is correspondingly simplified and this arrangement also contributes to the practical success of the present particular type of device without a tape reel. Also, the elimination of the conventional reel for the tape precludes practically all wear upon the tape to which it is usually subjected because of friction between the windings of the tape as they adjust themselves to the varying diameter of the tape coil upon the reel; and there is further eliminated the static that is incident to such condition in the reel type of device. The element of wear is still further reduced in my present device by having the tape confined at all times within the same plane. Also, with my present form of cartridge, it is not necessary that its position be always confined to a horizontal plane as in the reel type of device. Since there is greatly reduced and uniform degree of pull upon the tape in the operation of my present device, due to the random winding of the same within the cartridge, this too contributes substantially to the longer life of the tape because of greatly reduced wear upon the same. My manner of initially feeding the tape into the cartridge is another feature that makes possible the practical success of my present form of device. Briefly, I have produced a greatly simplified form of device which at the same time is capable of increased efficiency in its operation over a prolonged period of time; and it is to be understood that the present form of disclosure is merely for the purpose of illustration and that there might be devised various modifications thereof without departing from the spirit of my invention as herein set forth and claimed.

I claim:

1. In a tape recording and reproducing device, the combination of a tape deck and a tape cartridge adapted to be removably placed in operative position upon said tape deck, said tape deck having a capstan drive shaft and sound recording and reproducing means, said cartridge having an end wall, a pressure pad mounted within said cartridge for co-operation with said recording and reproducing means and a pressure roller mounted in the marginal portion of said cartridge bounded by said end wall in operative relation to said pressure pad and for cooperation with said capstan drive shaft, said marginal portion of said cartridge having a recess laterally spaced along said end wall from said pressure roller and of suitable width to accommodate said capstan drive shaft, said recess being of a depth wherein the plane of tangency between the capstan drive shaft and the pressure roller is substantially normal to said end wall, said cartridge being adapted to contain therewithin a sound tape movable into and out of operative position between said capstan drive shaft and pressure roller and between said recording and reproducing means and pressure pad according to the position of said cartridge with respect to said tape deck, and means for removably positioning said cartridge in operative relation upon said tape deck with said capstan drive shaft located within said recess and entirely within said marginal portion of said cartridge, whereby the tape will be directed into the interior of said cartridge.

2. The same structure as recited in foregoing claim 1 and with the addition of guard means affixed to the end wall of said cartridge so as to close the side of said recess away from said pressure roller and in the plane of the path of the tape so as to still further ensure direction of the tape into the interior of said cartridge.

3. The same structure as recited in foregoing claim 1 and in which said means for removably positioning said cartridge upon said tape deck comprises means providing slidable interengagement therebetween in a direction for establishing operative relation thereof.

References Cited

UNITED STATES PATENTS

| | | | |
|---|---|---|---|
| 2,679,394 | 5/1954 | Lear | 179—100.2 |
| 3,140,360 | 7/1964 | Whitworth | 179—100.2 |

BERNARD KONICK, *Primary Examiner.*

J. R. GOUDEAU, *Assistant Examiner.*

UNITED STATES PATENT OFFICE
CERTIFICATE OF CORRECTION

Patent No. 3,340,369 September 5, 1967

Aloysius Seidl

It is hereby certified that error appears in the above numbered patent requiring correction and that the said Letters Patent should read as corrected below.

Column 2, line 45, strike out "of the cartridge and near the side" and insert instead -- tape that extends in a direction --; line 58, for "though" read -- thought --.

Signed and sealed this 13th day of August 1968.

(SEAL)
Attest:

Edward M. Fletcher, Jr.
Attesting Officer

EDWARD J. BRENNER
Commissioner of Patents